United States Patent [19]

Sood

[11] Patent Number: 5,115,181
[45] Date of Patent: May 19, 1992

[54] POWER CONVERTER FOR A SWITCHED RELUCTANCE MOTOR

[75] Inventor: Pradeep K. Sood, St. Louis, Mo.

[73] Assignee: Emerson Electric Co., St. Louis, Mo.

[21] Appl. No.: 593,122

[22] Filed: Oct. 5, 1990

[51] Int. Cl.⁵ .......................... H02P 6/02; H02P 5/40
[52] U.S. Cl. ................................................. 318/701
[58] Field of Search ................ 318/701, 696, 759–762

[56] References Cited

U.S. PATENT DOCUMENTS

| | | | |
|---|---|---|---|
| 3,639,818 | 2/1972 | Wiart | 318/759 |
| 4,140,955 | 2/1979 | Drabing | 318/696 |
| 4,684,867 | 8/1987 | Miller et al. | 318/701 |

FOREIGN PATENT DOCUMENTS

WO89/01260 2/1989 United Kingdom ................ 318/701

*Primary Examiner*—David Smith, Jr.
*Attorney, Agent, or Firm*—Polster, Lieder, Woodruff & Lucchesi

[57] ABSTRACT

Power conversion apparatus (10) for an n-winding switched reluctance motor (M). A rectifier circuit (12) rectifies line voltage supplied to the motor. A switching circuit (14) supplies, at any one time, electrical energy to the motor winding most capable of converting it to mechanical work. A storage capacitor (C1) stores any unconverted portion of the energy and returns it to the winding during subsequent cycles. The switching circuit provides a substantially long conduction period 2 ($\theta$) for supplying electrical energy to the motor during each line voltage cycle. This permits use of a substantially smaller energy storage capacitor and results in a higher input power factor for circuit operation. Circuits for precharging the storage capacitor are eliminated. The switching circuit is capable of more modes of operation than previous circuits, while using fewer components, and therefore provides a lower cost design.

14 Claims, 2 Drawing Sheets

POWER CONVERTER FOR A SWITCHED RELUCTANCE MOTOR

BACKGROUND OF THE INVENTION

This invention relates to electrical power converters and, more particularly, to such a converter for n-winding switched reluctance motors.

Switched reluctance motors (SRM) are well known in the art. Although well known, SRM and their associated drives have not found broad acceptance. One reason for the lack of acceptance is the cost associated with the motor drive. SRM conventionally include a non wound rotor and a stator having a plurality of windings (n-winding) associated with the stator. N-winding switched reluctance motors, whether single phase or poly phase design, typically employ a power converter. In a three-phase motor, for example, the conventional converter requires two terminal connections per motor winding. Further the converter requires at least twelve (4n) solid state devices to provide electrical energy to the winding. Certain of these devices are diodes, a number of which are connected to form a diode bridge circuit; which, in combination with a capacitor also typically used in the converter, yields a relatively low power factor. The capacitor may use a precharge circuit and the diode bridge needs a high surge rating to protect against diode failure.

Besides the above, conventional converters require a high-voltage driver for each winding. The result is a converter, which, while functional, has a cost which is increased not only by the number of components required, but also by the high performance characteristics of those components.

Efforts have already been made to address various of the drawbacks found in conventional converters of the type described above. In U.S. Pat. No. 4,684,867 ('867) for example, there are shown three circuits (see FIGS. 5, 7, and 8) which attempt to simplify a converter's circuitry. In each instance, for example, the number of solid state devices required to provide electrical energy to the windings has been reduced. Further, a capacitor is provided for storing a charge produced by the excess current flowing through each of the motor windings. The capacitor is said to be chargeable to a voltage in excess of the dc source voltage for the circuit. To reduce the charge on this capacitor, each of the three described embodiments includes a bleed circuit for bleeding charge off the capacitor. In two of the embodiments (FIGS. 5 and 7), this bleed circuit is a resonant circuit including an inductor. In the other embodiment (FIG. 8), the bleed circuit includes a resistor. Regardless of the manner in which the bleed circuit is effected, the circuit operates to reduce the charge on the storage capacitor.

While achieving certain advantages over conventional converters, circuits of the type shown in the '867 patent, do have disadvantages. For example, the power factor obtainable from these circuits is no better than that obtainable from conventional converters. In addition, the energy storage requirements of the capacitor are such that the storage capacitor is no smaller than that found in conventional converters. Preferably, the storage capacitor should be significantly smaller yet still produce a constant output torque. Use of a smaller capacitor also permits capacitor construction from less expensive, and more reliable material.

Prior art designs of the type shown in the '867 patent also require a precharging circuit for controlling inrush current charging the storage capacitor whenever power is first applied to the circuit. The invention disclosed hereinafter does not require a precharging circuit.

SUMMARY OF THE INVENTION

Among the objects of the present invention may be noted the provision of a power converter for a multi-winding switched reluctance motor having n-windings; the provision of such a converter to use fewer solid state devices than is used in a conventional converter; the provision of such a converter to need only $n+1$ switches to transfer energy to the motor windings rather than the $2n$ switches used in the conventional converter; the provision of such a converter using only a single high-voltage driver to control switching to all windings rather than a high-voltage driver for each winding; the provision of such a converter in which output power is delivered over a longer portion of a line cycle so to produce a better input power factor than conventional converters particularly in the case of single phase power supply embodiment of my invention; the provision of such a converter having more operating modes than a conventional converter; the provision of such a converter having enhanced energy storage capabilities, particularly at higher voltages; the provision of such a converter requiring a smaller capacity capacitor to provide this storage capability, permitting the capacitor to be of different, less expensive and more reliable materials than capacitors used in other converters; the provision of such a converter not to require a bleed circuit to bleed charge from the storage capacitor thus to reduce the complexity and cost of the converter; the provision of such a converter having a reduced number of motor input terminal connections; and, the provision of such a converter to provide better performance at lower cost than conventional converters.

Briefly, power conversion apparatus of the present invention is a power converter for a multi-winding switched reluctance motor having n-windings. A rectifier circuit rectifies line voltage supplied to the motor and a switching circuit supplies, at any one time, electrical energy to the motor winding most capable of converting it to mechanical work. A capacitor is connected between a common junction connection point of the motor windings and one side of the rectified line voltage. The capacitor stores any unconverted portion of motor winding energy and returns it to the windings during the subsequent motor cycles. The switching circuit arrangement provides a long conduction period for supplying electrical energy to the motor. In single phase line embodiments, the conduction angel is equal to at least $2(1/\cos(Eb/Vpk))$ radians for each line voltage cycle, where Eb is the motor's back emf, and Vpk is the peak voltage of the rectified line voltage. As a result of placement and operation, the capacitor is substantially smaller than capacitors used in previous circuits designed for similar operational purposes and the need for a pre- charge circuit is eliminated.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1A:
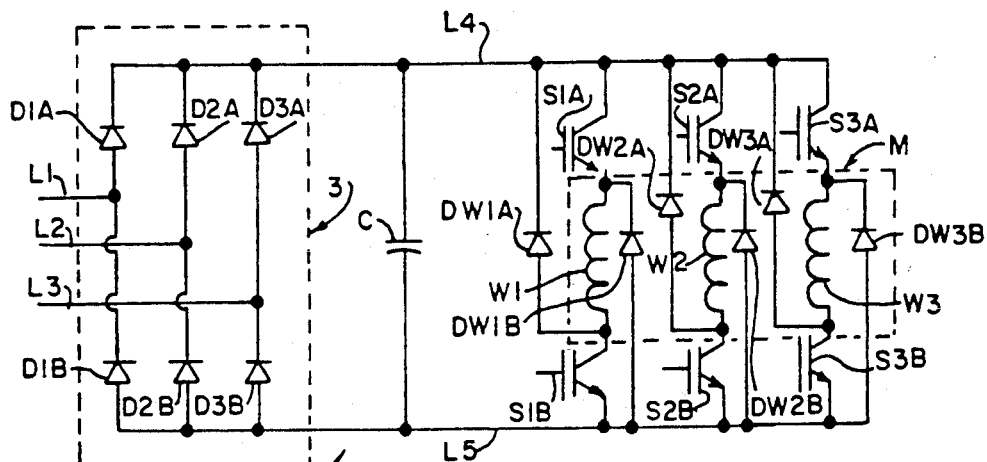
FIGS. 1a and 1b are schematic circuit diagrams of prior art power converters for a switched reluctance motor.

Referring to the drawings, a conventional power converter 1 is shown in FIG. 1a and is for a switched reluctance motor M. The motor is supplied from a three-phase source and has windings W1, W2, and W3 provided in a conventional manner. Three phase line voltage is supplied to the converter over lines L1, L2, and L3. The input stage of the converter comprises a full-wave rectifier 3 for each voltage phase. The rectifier for each phase is comprised of a pair of diodes, diodes D1A and D1B for the first phase, D2A and D2B for the second phase, and D3A and D3B for the third phase.

Electrical energy is transferred to the motor windings through a series of switching circuits, one associated with each winding. Each circuit employs two solid state switches whose emitter-collector paths are connected in line with a respective end of each winding. The switches are denoted S1A and S1B for the winding W1, S2A and S2B for winding W2, and S3A and S3B for winding W3. The output of rectifier 3 is supplied on a bus line L4 to each winding through an associated switch S1A, S2A, and S3B, during one-half cycle, and to a return line L5 through switches S1B, S2B, and S3B. The winding through which electrical energy is directed is determined by which set of associated switches is enabled at any one time.

Each winding circuit also includes a pair of associated diodes. These are designated DW1A and DW1B for winding W1, DW2A and DW2B for winding W2, and DW3A and DW3B for winding W3. The diodes are connected in the same manner in each winding circuit. For example, diode DW1A is connected in parallel with winding W1 and switch S1A; while, diode DW1B is connected in parallel with the winding and switch S1B.

Lastly, converter 1 includes a capacitor C connected between lines L4 and L5 in parallel with the rectifier circuit and the motor windings. Capacitor C is a storage capacitor for storing electrical energy from the line and for storing electrical energy not converted by the windings during a motor cycle.

In analyzing this conventional converter 1, it will be noted that it requires six motor terminals or two times the number of motor windings (i.e., 2n) for connection to motor M. Further, it also requires 6 (2n) electrical switches to direct energy through the three motor windings; and, 12 (4n) total solid state devices (switches and diodes) to accomplish its operation.

Figure 1B:
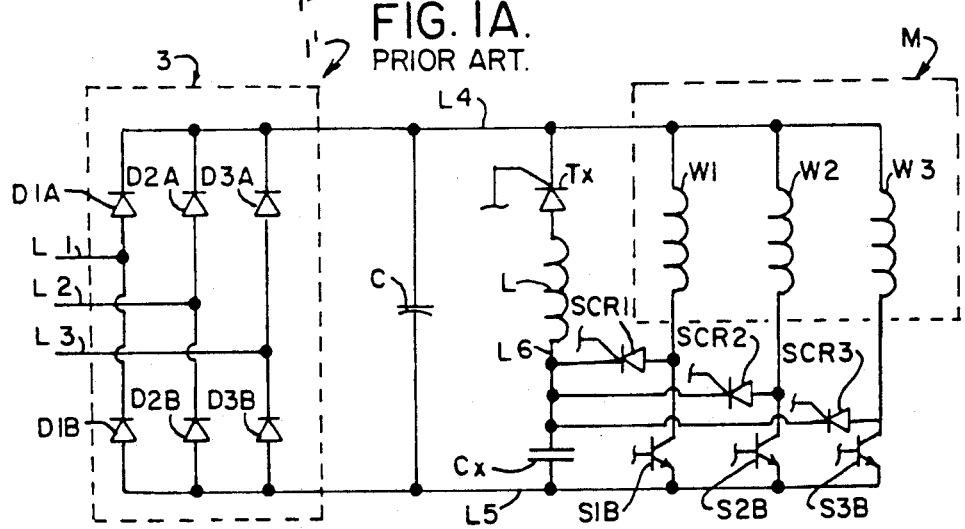

An alternate embodiment of a conventional power converter is indicated 1, in FIG. 1b. Similar converter circuits are shown, for example, in United States Patent No. 4,684,867. This converter differs from that shown in FIG. 1a in that the number of electrical switches has been reduced from six to four. These include the transistors S1B-S3B and the thyristor Tx. Current flow through a particular motor winding is a function of which transistor switch S1B-S3B is conducting at a particular moment. When the transistor switch is not conducting, the current in that loop is directed through an appropriate silicon controlled rectifier SCR1-SCR3 to a dump or storage capacitor Cx. This capacitor is inserted in a circuit path L6 extending between lines L4 and L5. Also included in path L6 are the thyristor Tx and an inductor L. Inductor L and capacitors C and Cx form a resonant loop by which the electrical charge stored in capacitor Cx is transferred to capacitor C when the thyristor is switched into conduction.

Figure 6A:
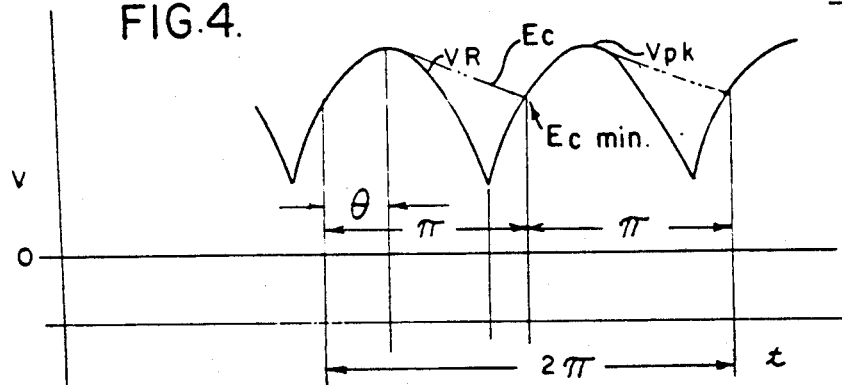

Referring to FIG. 6a, a plot of rectified input voltage over time is shown for the circuits of FIGS. 1a and 1b for the case of a single phase supply. The peak rectified voltage level is indicated Vpk. In addition, the voltage across capacitor C indicated by Ec. One complete cycle of rectified voltage is indicated by $2(\pi)$, and one-half cycle by $(\pi)$. For the circuits of FIGS. 1a and 1b, transfer of energy from the line can only occur for a maximum period equal to $1/\cos(Ecmin/Vpk)$ radians. This period is referred to as the conduction angle ($\theta$). Because the conduction time is so short compared to the half cycle of conduction, a large amount of energy must be stored in capacitors C and Cx.

Figure 2:
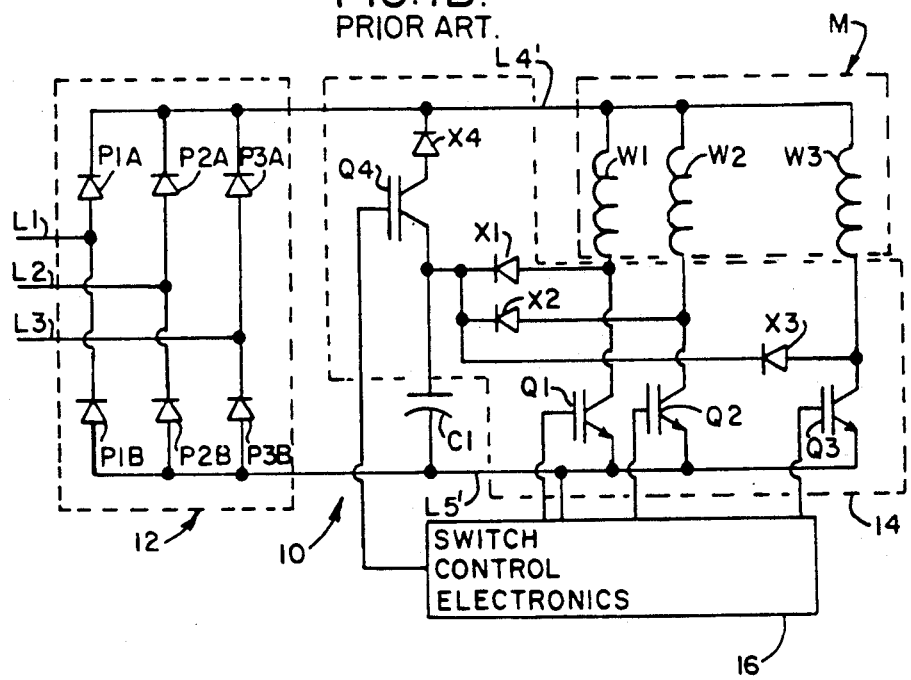
FIG. 2 is a schematic of a first embodiment of power conversion apparatus of the present invention.

Referring to FIG. 2, a power conversion apparatus of the present invention is also for an N-winding switched reluctance motor M and is designated 10. For a three-phase motor, the converter includes a rectifying means 12 for rectifying line voltages supplied to the motor. As will be appreciated by these skilled in the art, power may be supplied from either a single phase or a three phase source. FIG. 2 illustrates a three phase supply provided over lines L1, L2, and L3. Means 12 is connected across supply lines L4' and L5' and comprises a pair of associated diodes for each voltage phase to full-wave rectify the voltage. These diodes are designated P1A and P1B for one phase, P2A and P2B for a second phase, and P3A and P3B for the third phase.

Apparatus 10 next includes switch means 14 for supplying, at any one time during a motor cycle, electrical energy to the motor winding most capable of converting it to useful work. As shown in FIG. 2, one end of each winding is commonly connected to line L4'. The other end of the winding is connected to line L5' through an associated solid state switch. These switches are designated Q1, Q2, and Q3 respectively. The winding through which electrical energy is directed is determined by which one of these switches is enabled at any one time. Operation of the switches is controlled by a switching electronics 16 which is responsive to the dc (rectified line voltage) level, and the instantaneous current level (I) in the circuit. It will be understood that the current and voltage levels at various points throughout the converter can be sensed by the switching electronics. Operation of unit 16 is such that an energy conduction period is produced for supplying electrical energy to the motor equal to $2(1/\cos(Eb/Vpk))$radians during each line voltage cycle of a single phase supply, where Eb is the motor's back emf, and Vpk is the peak voltage of the rectified line voltage. Since motor back emf decreases as motor speed decreases, the conduction period shown as $2(\theta)$ in FIG. 6b increases at lower motor speeds, further increasing the direct transfer of energy from the line supply and reducing the need for energy storage in the circuit of my invention.

A diode X1, X2, or X3 is respectively connected in parallel between a winding and its associated switch. The cathodes of each diode are commonly connected and, in turn, these are connected to the emitter of a solid state switch Q4 that is connected between lines L4' and L5'. A diode X4 is connected between the collector of switch Q4 and line L4'; while, a capacitor C1 is connected between the emitter of the switch and line L5'. Capacitor C1 comprises means for storing any unconverted portion of the energy supplied to the windings so it can be returned to the windings during subsequent cycles.

In operation, when the solid state switch connected with a winding is enabled, full-wave rectified voltage is supplied to that winding. When the associated switch is non-conductive or disabled, the voltage is routed through the associated diode to capacitor C1. By this action, a reversing flux is established in that winding.

In comparing apparatus 10 of the present invention with the conventional converters 1 and 1' shown in FIGS. 1a and 1b, a number of differences are readily apparent:

First, with respect to converter 1, apparatus 10 only requires n+1 solid state switches as compared with the 2n switches required in converter 1, where n is the number of motor windings.

Second, the total number of solid state devices (switches plus diodes) required is 12 with converter 1, while only eight (2(n+1)) are required with apparatus 10.

Third, only n+1 motor terminal connections are required in apparatus 10, as compared with 2n in converter 10. The result is that apparatus 10 is simpler in design than converter 1 and less expensive both as to the number of parts it requires and in assembly time. In addition, apparatus 10 will have a higher power factor particularly at lower motor speeds. It will also have more operating modes than converter 1 since it allows application of voltages higher than the bus voltages to the windings.

Figure 6B:
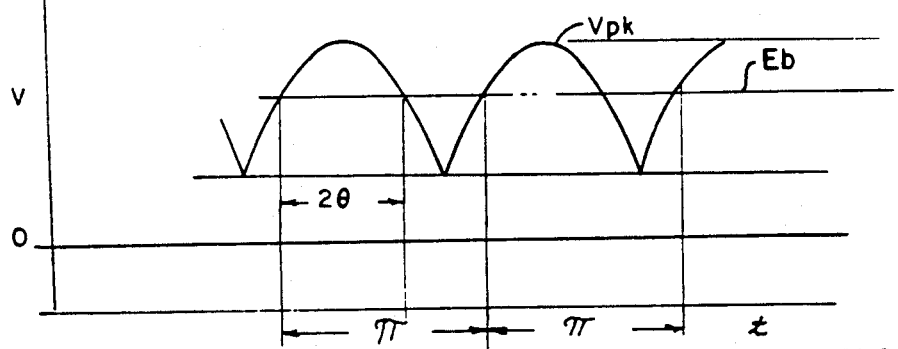

Fourth, with respect to converter 1', the conduction angle is, as shown in FIG. 6b, $2(\theta)$ as compared to $(\theta)$ when back emf Eb is equal to Ecmin. Thus, the conduction angle is at least twice as long at this condition of motor operation. This results in more energy transfer to the winding directly from the line and the consequent need to store less energy. As a result, capacitor C1 needs only have $\frac{1}{4}$ to $\frac{3}{8}$ the energy storage capacity of capacitor C. Further, converter 10 may operate with peak values of 2Vpk and a minimum value of Vpk. This allows the capacitance value of capacitor C1 to be $\frac{1}{4}$ to 1/5 the size of capacitor C. This means capacitor C1 can now be of a different and less expensive and more reliable material than capacitor C. Further, because the substantial portion of energy is already transferred to the appropriate winding, the amount stored in capacitor C1 is more readily returned to the windings during subsequent motor cycles.

Figure 3:
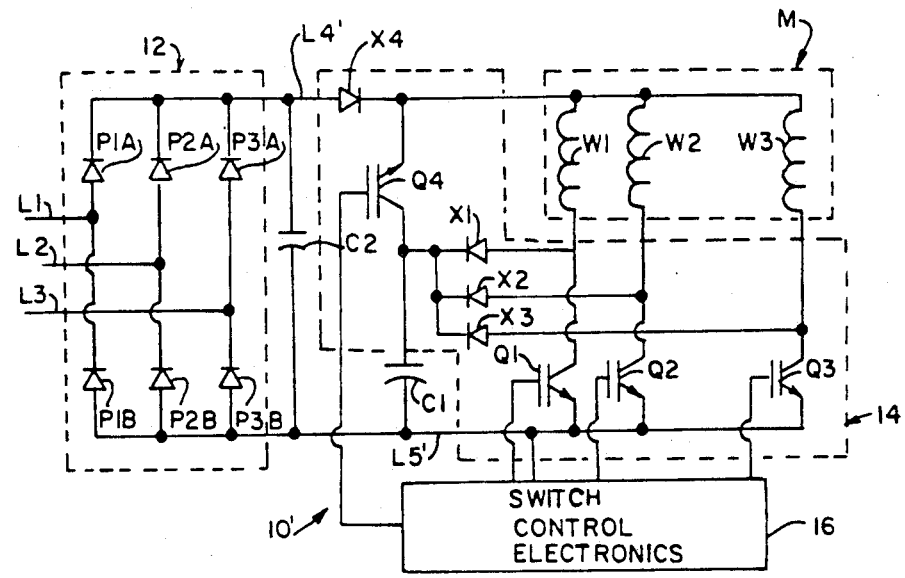
FIG. 3 is a schematic of a second embodiment of the invention.

Referring to FIG. 3, an alternate embodiment 10, of the apparatus is shown. Apparatus 10' is similar to apparatus 10, except it includes a second capacitor C2 connected between lines L4' and L5'. In this embodiment, diode X4 is connected in series with line L4' to insure that all of the energy collected in capacitor C1 is returned to the motor for conversion into useful work and none go back into storage capacitor C2. The circuit operation of FIG. 3 is unlike the circuit operation of FIG. 1b, where the collected energy of capacitor Cx is back transferred to the storage capacitor C via inductor L and switch Tx. The energy is then transferred to the motor in subsequent motor rotations. Thus, apparatus 10' is an improvement over the circuit of FIG. 1b because it eliminates the back transfer of energy and eliminates the inductor L.

Figure 4:
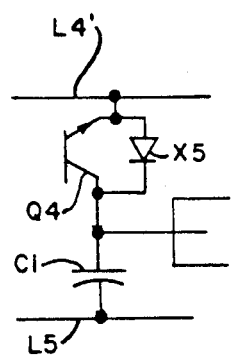
FIG. 4 is a partial schematic illustrating a second, alternative arrangement for certain circuit elements used in the embodiment of FIG. 2.
Figure 5:
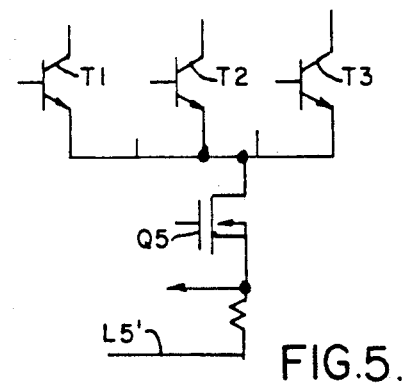
FIG. 5 is a partial schematic illustrating a second, alternative arrangement for certain other circuit element used in the embodiment of FIG. 2; and, FIGS. 6a and 6b graphically illustrate the respective conduction angles for the case of a single-phase line supply which are obtainable in the prior art converters of FIGS. 1a and 1b (FIG. 6a) and in a converter of the present invention (FIG. 6b).

Other features of the invention are shown in FIGS. 4 and 5. As shown in FIG. 4, a diode X5 can be connected in parallel across the emitter-collector path of switch Q4. Diode X5 maybe internal to a solid state switch, such as a MOSFET, if desired.

Referring to FIG. 5, the high speed switches Q1, Q2, and Q3 shown in FIG. 2 are replaced with slower transistors T1, T2, and T3. The collectors of each transistor are commonly connected. A high speed solid state switch is now interposed between the transistor collectors and line L5'. This means one high-speed device replaces three such devices.

It should be obvious to those skilled in the art that many variations of the present invention as disclosed and claimed herein are possible without departing from the coverage of the invention as claimed.

Having thus described the invention, what is claimed and desired to be secured by Letters Patent is:

1. A power conversion apparatus for a switched reluctance motor having n-windings, each winding having a first end and a second end comprising:

means for rectifying line voltage supplied to the motor, said rectifying means having a first electrical side and a second electrical side, the first end of each of said n-windings of said motor being electrically connected to the first side of said rectifying means;

switch means electrically connected to said n-winding for selectively energizing the n-winding of said motor most capable of converting electrical energy to useful work;

capacitor means electrically connected between the second end of each of said n-windings and the second side of said rectifying means, said capacitor means storing any unconverted portion of the energy of said n-windings and returning it to said n-windings during subsequent cycles, said switch means including a capacitor discharge switch for discharging said capacitor means through said windings, said last mentioned switch being electrically connected between said second end of each of said n-windings and the first side of said rectifying means;

switch control means for controlling operation of said switch means and said discharge switch for producing an energy period for supplying electrical energy to the n-motor windings which is equal to at least $2(1/\cos(Eb/Vpk))$ radians for each line voltage cycle, where Eb is the motor's back emf, and Vpk is the peak voltage of the rectified line voltage; and means for preventing flow of current from the capacitor means toward the rectifying means so that substantially all the current which flows from the capacitor means flows to said n-windings when the capacitor means is discharged through the discharge switch.

2. The apparatus of claim 1 wherein the switch means comprises a plurality of switches the number of which is determined by the formula n+1 where n is the number of motor windings.

3. The apparatus of claim 2 wherein the line voltage is multi-phase and the rectifying means includes a rectifier for each phase, and the conduction period for supplying electrical energy to the motor is less than 2(1/cos(Eb/Vpk) radians.

4. The apparatus of claim 3 wherein the rectifying means comprises a full-wave rectifier for each phase.

5. The apparatus of claim 1 wherein the switching means includes a solid-state switch series connected with each motor winding.

6. The apparatus of claim 5 wherein the storing means further includes a diode connected in parallel with each solid state switch, the diodes being commonly connected to one side of the capacitor whereby electrical energy is directed through a motor winding when its associated solid state switch is conductive and to the capacitor when the switch is non-conductive.

7. The apparatus of claim 6 wherein the rectifying means are commonly connected to one side of the motor windings and the capacitor is connected in parallel thereto.

8. The apparatus of claim 5 wherein the solid state switches are power switches and the switching means further includes a low-voltage, fast switching device commonly connected to the switching inputs of the solid state switches to turn them on and off.

9. The apparatus of claim 2 wherein the switch means includes solid state switches and solid state diodes, the total number of such solid state devices being determined by the formula 2(n+1) where n is the number of motor windings.

10. The power conversion apparatus as set forth in claim 1 further including a second capacitor means disposed between the rectifying means and the discharge switch, said second capacitor means being connected across the rectifying means, said preventing means being disposed so as to prevent flow of current from the first capacitor means to the second capacitor means.

11. A power converter and motor comprising:

a switched reluctance motor having n-windings associated with it, each of said n-windings having a first end and a second end;

a rectifier for rectifying the voltage supplied to said power converter, said rectifier having a first electrical side and a second electrical side, the first end of each of said n-windings being electrically connected to said first electrical side of said rectifier, a second end of said n-windings being electrically connected to a common connection point;

a plurality of winding switches electrically connected one each between the second end of said n-windings and the second side of said rectifying means;

a capacitor electrically connected between sad common connection point and the second side of said rectifying means a discharge switch electrically connected between said common connection point and the first side of said rectifying means;

switch control means electrically connected to said plurality of winding switches and said discharge switch for controlling the duration and magnitude of electrical energy supplied to respective ones of said n-windings; and means for preventing flow of current from the capacitor toward the rectifier so that substantially all the current which flows from the capacitor flows to said n-windings when the capacitor is discharged through the discharge switch.

12. The power converter of claim 11 wherein the switch means comprises a plurality of switches the number of which is determined brim the formula n+1, where n is the number of motor windings.

13. The power converter and motor of claim 11 wherein the number of n-winding switches and discharge switch is determined from the formula n+1, where n is the number of motor windings.

14. The power converter and motor as set forth in claim 11 further including a second capacitor disposed between the rectifier and the discharge switch, said second capacitor being connected across the rectifier, said preventing means being disposed so as to prevent flow of current form the first capacitor to the second capacitor.

* * * * *